United States Patent
Miller et al.

(10) Patent No.: US 11,019,395 B2
(45) Date of Patent: May 25, 2021

(54) AUTOMATIC DIGITAL REPRESENTATIONS OF EVENTS

(71) Applicant: Facebook, Inc., Menlo Park, CA (US)

(72) Inventors: David Brandon Miller, Studio City, CA (US); Amit Puntambekar, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/551,758

(22) Filed: Aug. 27, 2019

(65) Prior Publication Data
US 2021/0067831 A1 Mar. 4, 2021

(51) Int. Cl.
H04N 21/442 (2011.01)
H04N 21/845 (2011.01)
G06F 16/901 (2019.01)
H04N 21/81 (2011.01)

(52) U.S. Cl.
CPC ... *H04N 21/44218* (2013.01); *G06F 16/9024* (2019.01); *H04N 21/8146* (2013.01); *H04N 21/8456* (2013.01)

(58) Field of Classification Search
CPC ......... H04N 21/44218; H04N 21/8146; H04N 21/8456; H04N 21/4826; H04N 21/442; H04N 21/44204; H04N 21/252; H04N 21/258; H04N 21/25891; H04N 21/25883; H04N 21/4532; H04N 21/251; H04N 21/45; H04N 21/466; H04N 21/488; G06F 16/9024
See application file for complete search history.

(56) References Cited

U.S. PATENT DOCUMENTS

| | | | |
|---|---|---|---|
| 2009/0133047 A1* | 5/2009 | Lee | A61B 5/0205 725/10 |
| 2011/0263946 A1* | 10/2011 | el Kaliouby | G06K 9/00335 600/300 |
| 2013/0298146 A1* | 11/2013 | Conrad | H04N 21/44213 725/12 |
| 2015/0113551 A1* | 4/2015 | Hicks | H04N 21/44218 725/10 |
| 2015/0358680 A1* | 12/2015 | Feldstein | H04N 21/478 725/43 |
| 2016/0353252 A1* | 12/2016 | Krasadakis | H04N 21/4756 |
| 2017/0257651 A1* | 9/2017 | Zhu | H04N 21/47217 |
| 2019/0056856 A1* | 2/2019 | Simmons | G06F 3/013 |

* cited by examiner

*Primary Examiner* — Alexander Gee
(74) *Attorney, Agent, or Firm* — FisherBroyles, LLP

(57) ABSTRACT

Systems and methods for creating automatic digital representations of events may include (1) collecting data indicative of one or more emotions experienced by viewers of an event, (2) generating a timeline of the emotions based on the collected data, (3) creating a dynamic digital representation of the timeline, and (4) transmitting the dynamic digital representation to a device for display via a display element of the device. Various other methods, systems, and computer-readable media are also disclosed.

20 Claims, 7 Drawing Sheets

AUTOMATIC DIGITAL REPRESENTATIONS OF EVENTS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
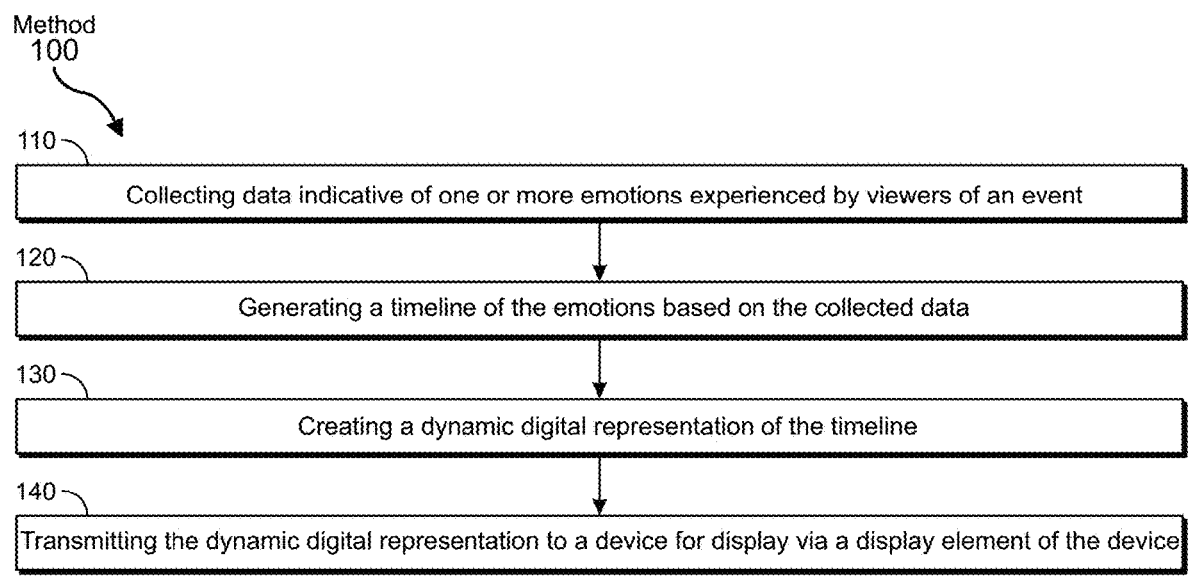
FIG. 1 is a flow diagram of an exemplary method for creating and maintaining automatic digital representations of events.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Individuals who miss a digitally broadcasted event, and who have limited time to dedicate to catching up on the event, may elect to consume a short recap of the event (e.g., a final score of a sporting match). However, while a short recap may satisfy an individual's time constraints, traditional recaps (e.g., a final score) may fail to convey the drama and emotion that may have occurred during the event, leaving consumers of traditional recaps ultimately unsatisfied. In response, the present disclosure identifies a need for improved systems and methods for creating a recap of an event that conveys automatically identified emotional content of the event.

The present disclosure provides an elegant system for (1) algorithmically identifying the emotion experienced by initial viewers (e.g., live viewers) of an event and then (2) creating a truncated representation of the event that portrays the identified emotion. In some examples, the event may represent a competition, such as a sporting event. In these examples, the representation may include (1) a dynamic graph (e.g., a bar graph with dueling bars) that reflects a metric of the competition such as a score and/or (2) one or more media effects that portray the emotion. In some embodiments, the representation may include clips from the event corresponding to portions of the event that were algorithmically determined to be associated with a particular emotion and/or intensity of emotion.

The disclosed systems and methods may identify the emotions of an event based on a variety of signals (e.g., a number of comments posted to a platform during the various portions of the event and/or content within such comments, a characteristic of a score such as a closeness of the score and/or a shift in the score, a loudness of a crowd watching the event, and/or a speed and/or other quality of the speech of an announcer of the event). By providing a digital representation of the emotions associated with an event, as opposed to merely providing a metric-based representation such as a final score, followers of the event who did not initially view the event may experience some of the emotion experience by initial viewers (e.g., live viewers of the event).

The present disclosure may improve the functioning of a computer itself by improving the computer's ability to identify and depict emotional responses to events without requiring manual input (i.e., human analysis) to do so. This may also improve the heuristic-based analysis of live events by improving a classifier trained to identify the emotional content of an event.

The following will provide, with reference to FIG. 1, detailed descriptions of computer-implemented methods for creating and maintaining automatic digital representations of events. Detailed descriptions of corresponding example systems will also be provided in connection with FIG. 2. Detailed descriptions of corresponding exemplary dynamic graphs will be provided in connection with FIGS. 3A-6B.

FIG. 1 is a flow diagram of an exemplary computer-implemented method 100 for creating and maintaining automatic digital representations of events. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 (e.g., as shown in exemplary system 200 in FIG. 2) and/or modules operating in a user device 204.

Server 202 generally represents any type or form of backend computing device that may perform one or more functions directed at creating and/or providing digital representations of events. In some examples, server 202 may provide digital representations of events in conjunction with social networking functions as part of a social networking platform that manages server 202. Although illustrated as a single entity in FIG. 2, server 202 may include and/or represent a group of multiple servers that operate in conjunction with one another.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc. In some examples, user device 204 may display a digital recording of an event and/or a truncated digital representation of an event received from server 202.

Figure 2:
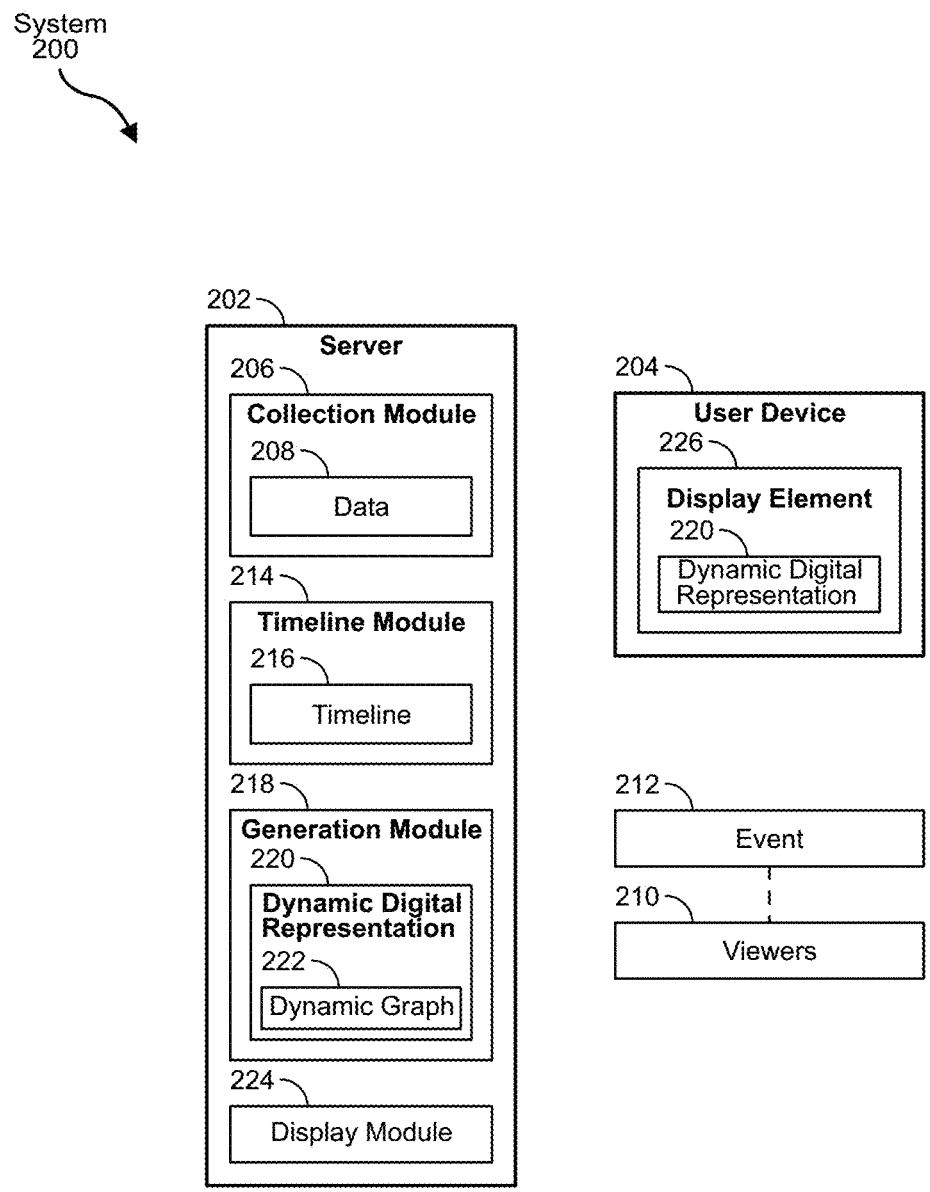
FIG. 2 is a block diagram of an exemplary system for creating and maintaining automatic digital representations of events.

Returning to FIG. 1, at step 110, one or more of the systems described herein may collect data indicative of one or more emotions experienced by viewers of an event. For example, as illustrated in FIG. 2, a collection module 206 may collect data 208 indicative of one or more emotions experience by viewers 210 of an event 212.

Event 212 may generally represent any type or form of occurrence (e.g., that ensues at a discrete time and/or place), which is accessible to an audience (e.g., viewers 210). In some examples, event 212 may represent a competition (e.g., a score-based competition and/or a competition in which there is a defined winner and/or loser).

In some examples, an audience for event 212 may be physically present (e.g., within a defined physical proximity of event 212). For example, event 212 may represent a sporting event, such as a football game, in which a physical audience observes the sporting event from a stadium where the sporting event is being played. As another example, event 212 may represent a performance and/or an awards ceremony (e.g., for a cinematic award and/or a music award) held in a venue with an audience present.

In additional or alternative examples, an audience for event 212 may be virtually present. An audience may be virtually present in a variety of ways. For example, a virtual audience may connect to a live stream and/or broadcast of event 212 (e.g., via a user device, a radio, a television, etc.). Examples of events with a virtual audience may include, without limitation, a broadcasted and/or televised political election between two or more candidates running for office, a program such as a sitcom or a reality show, and/or a web tutorial.

In some examples, event 212 may be accessed by both a physical audience and a live virtual audience. For example, a sporting event may be observed by an audience that is physically present but may also be broadcasted to a virtual audience (e.g., via an online sporting platform and/or a social media platform).

Collection module 206 may collect a variety of data indicative of the emotions experienced by viewers 210. For example, in examples in which event 212 is associated with a score (e.g., examples in which event 212 represents a score-based event such as a score-based competition), collection module 206 may collect data relating to the score (e.g., a progression of a score, a closeness of the score, a change in a competitor with the highest score, and/or a magnitude of a change in the score). Additionally or alternatively, collection module 206 may collect data relating to timing within event 212 (e.g., a time remaining within event 212 and/or a segment of event 212).

In some examples, collection module 206 may collect data relating to a reaction of an audience attending event 212. For example, in examples in which event 212 is observed by a physical audience, collection module 206 may collect data relating to an audible loudness of the audience during event 212 (e.g., a level of noise made from cheers, shouts, and/or chatter as event 212 progresses). In related examples, collection module 206 may collect data relating to a rate of speech, a volume of speech, and/or an increase or decrease in the rate and/or volume of speech of an announcer of event 212. In some embodiments, collection module 206 may also identify a timestamp corresponding to various data collected from the physical audience (e.g., a time at which a loudness of the audience surpasses a threshold, etc.).

In examples in which event 212 is observed by a virtual audience, collection module 206 may collect data relating to a virtual reaction to event 212 from the virtual audience. For example, collection module 206 may collect data relating to one or more digital comments posted by the virtual audience that correspond to event 212. The term "digital comment" may refer to any type or form of digital response to event 212 (e.g., a text-based comment, a selection of a digital emoji such as a thumbs-up emoji and/or a heart emoji, a GIF, a video clip, and/or a digital photograph).

Collection module 206 may collect digital comments from a variety of sources. For example, collection module 206 may collect one or more digital comments from a commenting section of a webpage broadcasting event 212 and/or dedicated to event 212. As another example, collection module 206 may collect one or more digital comments from a post to a social media platform, which tags and/or mentions event 212, and/or digital comments to a public group page associated with event 212.

Collection module 206 may collect a variety of data from a digital comment. For example, collection module 206 may identify content within a digital comment. In some examples, a comment may have posted synchronously as event 212 occurred (e.g., digital comments such as "Smith drops the ball!", a GIF of a ball being dropped, and/or an emoji of a sad face). In these examples, collection module 206 may also identify a timestamp corresponding to the identified content. In other examples, the comments may have posted asynchronously (e.g., a comment with the text "That was so sad when Smith dropped the ball!" posted after event 212 completed and/or a comment with the text "I can't wait for the game tonight!" posted before event 212 occurred).

In addition, or as an alternative, to identifying content within digital comments, collection module 206 may determine a quantitative metric relating to the digital comments. For example, collection module 206 may ascertain a number of comments posted about event 212, a number of comments posted at a particular timestamp during event 212 and/or a change in the number of comments at the particular timestamp, and/or a number of comments that include particular content (e.g., a number of a certain type of emoji at the particular timestamp).

Collection module 206 may collect data 208 using a variety of computer-implemented processes. In some examples, collection module 206 may collect data 208 using a computer-implemented sensor. For example, collection module 206 may rely on a sound pressure level (SPL) sensor (e.g., within a decibel meter) to detect a loudness of a physical audience attending event 212. In one embodiment, collection module 206 may rely on computer-implemented speech analysis models (e.g., voice recognition models) to identify speech-related data (e.g., a rate of speech from an announcer of event 212 and/or content of the announcer's speech). In examples in which event 212 is observed by a physical audience, the computer-implemented methods for collecting data 208 may include collecting data 208 via a device that is physically present. Additionally or alternatively, collection module 206 may collect data 208 from a recording of event 212 (e.g., in embodiments in which event 212 is digitally broadcasted and/or played for a virtual audience).

Collection module 206 may collect data 208 from a variety of sources. In some examples, collection module 206 may collect data 208 from a primary source (e.g., from a sensor on-site where event 212 is occurring and/or from a webpage provided by a platform sponsoring for event 212). Additionally or alternatively, collection module 206 may collect data 208 via a third-party entity (e.g., a webpage such as a social media webpage rebroadcasting event 212 and/or maintaining data relating to event 212).

Returning to FIG. 1, at step 120, one or more of the systems described herein may generate a timeline of the emotions based on the collected data. For example, as illustrated in FIG. 2, a timeline module 214 may generate a timeline 216 based on data 208.

Timeline module 214 may generate timeline 216 in a variety of ways. In some examples, timeline module 214 may organize the various data points within data 208 by time (e.g., clustering data points around various timestamps within event 212). For example, at each timestamp within timeline 216, timeline module 214 may identify metrics of various factors described within data 208 (e.g., a score, a loudness of an audience, a number of digital comments made to an online platform, etc.). Then, timeline module 214 may identify an emotion (e.g., a type of emotion and/or an intensity of emotion) associated with each timestamp based on the data points clustered around the timestamp.

Timeline module 214 may identify the emotion in a variety of ways. In some examples, timeline module 214 may rely on a machine learning model (e.g., a neural network) to identify the emotion (e.g., by applying the clustered data points as inputs and identifying the emotion as an output). Additionally or alternatively, timeline module 214 may rely on a policy with one or more instructions for identifying an emotion based on a data point and/or a combination of data points. For example, timeline module 214 may rely on a policy with an instruction to assign a designated emotion to a timestamp at which a loudness of a physical audience surpasses a designated loudness threshold.

Timeline module 214 may label the emotions within timeline 216 in a variety of ways. In some examples, labels may indicate a type of emotion (e.g., "excitement," "anxiety," "frustration," etc.). Additionally or alternatively, labels may indicate an intensity of emotion. For example, labels may include an intensity classification such as "high" or "low" and/or may quantify an intensity level (e.g., on a scale of 0-10). As a specific example, timeline module 214 may indicate a level of excitement on a scale of 0-10 for each timestamp within timeline 216. In one embodiment, timeline module 214 may only indicate an intensity of emotion, without categorizing the emotion (e.g., by indicating an overall intensity of emotion on a scale of 0-10 for each timestamp within timeline 216).

In some examples, timeline module 214 may identify, based on timeline 216, one or more moments with an intensity of emotion that surpasses a predetermined intensity threshold. Then, timeline module 214 may select, from a digital recording of event 212, one or more clips (e.g., video clips and/or audio clips) of the identified moments. Timeline module 214 may then include the selected clips within timeline 216.

Returning to FIG. 1, at step 130, one or more of the systems described herein may create a dynamic digital representation of the timeline. For example, as illustrated in FIG. 2, a generation module 218 may create a dynamic digital representation 220 of timeline 216.

The term "dynamic digital representation" may generally refer to any type or form of visual display that digitally portrays one or more of the emotions identified within timeline 216 (e.g., by portraying an identified type and/or intensity of emotion). In some examples, dynamic digital representation 220 may additionally provide a truncated synopsis of event 212 (e.g., a synopsis of a score and/or score progression). As a specific example, dynamic digital representation 220 may condense a two-hour event into a one-minute visual synopsis that depicts a score progression during event 212 together with emotions detected from viewers 210 as the score progressed.

As its name implies, dynamic digital representation 220 may include one or more dynamic elements (e.g., dynamic visual elements that change over time as dynamic digital representation 220 progresses temporally). Dynamic digital representation 220 may include a variety of different dynamic elements. In some examples (e.g., in examples in which event 212 involves a competition), dynamic digital representation 220 may include a dynamic graph 222.

The term "dynamic graph" may generally refer to a diagram that dynamically shows a relationship (e.g., a metric such as an emotion and/or score relative to time and/or a metric associated with one entity relative to a metric associated with another entity). Dynamic graph 222 may represent any type or form of diagram (e.g., a bar graph, a line graph, a chart, a grid, etc.) and may have any visual appearance (e.g., any style, color, size, orientation, etc.).

In some examples, dynamic graph 222 may visually depict a relative advancement and/or regression of one or more entities (e.g., one or more teams and/or competitors) participating in event 212. Dynamic graph 222 may show the relative advancement and/or regression many different ways. For example, each entity may be represented by a different visual element (e.g., a line, a bar, and/or a graphic) that depicts an advancement and/or regression of the entity (e.g., a positive or negative change in the entity's score and/or a non-score metric of advancement and/or regression such as a change in the detected audience responses to the entity as event 212 progresses).

The visual elements within dynamic graph 222 may show a relative advancement and/or regression in a variety of ways. For example, the visual elements may show an advancement and/or regression by changing appearance (e.g., changing size and/or color) and/or by changing a spatial position the visual elements occupy within dynamic graph 222. As a specific example, dynamic graph 222 may represent a bar graph with two or more dynamic bars. Each bar may have a height that corresponds to a score of a different entity competing within event 212. In this example, one or more of the bars may change heights over time, visually depicting changes in score as event 212 progresses temporally.

In addition to changing appearance to show an entity's advancement and/or regression, the visual elements within dynamic graph 222 may change to depict an emotion associated with the advancement and/or regression. Returning to the specific example in which dynamic graph 222 represents a bar graph with two or more bars, a bar may visually tremble before increasing in height at a point within dynamic digital representation 220 that corresponds to a moment of intense emotion (e.g., a moment during which a change in score also corresponds to a change in which team has the highest score).

Figure 3A:
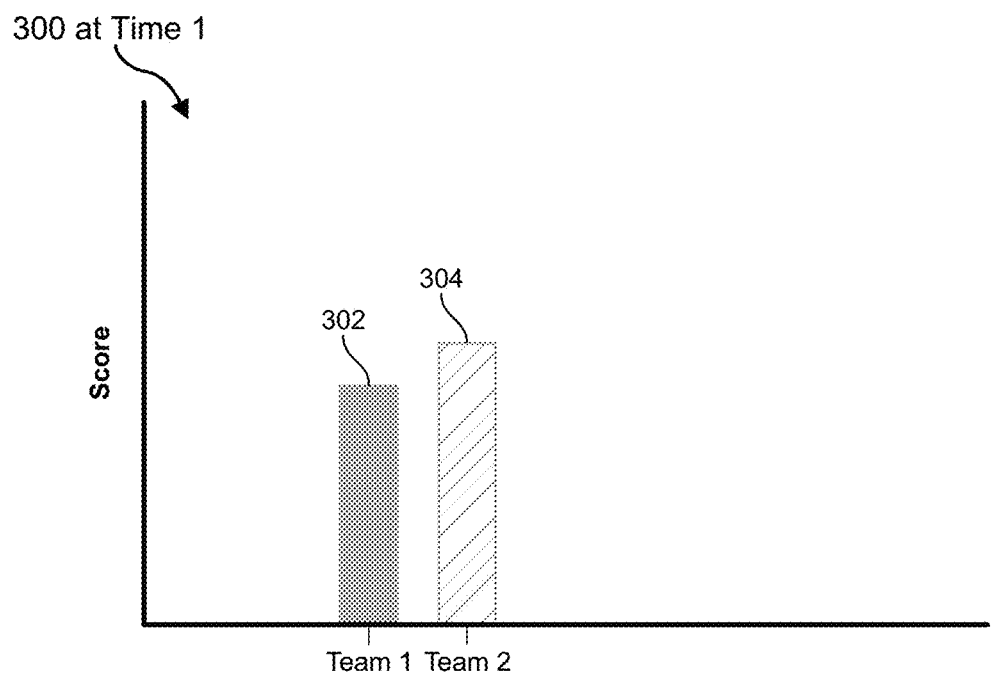
FIGS. 3A-3C are an illustration of an exemplary dynamic bar graph digitally depicting dueling event scores in one embodiment.
Figure 3B:
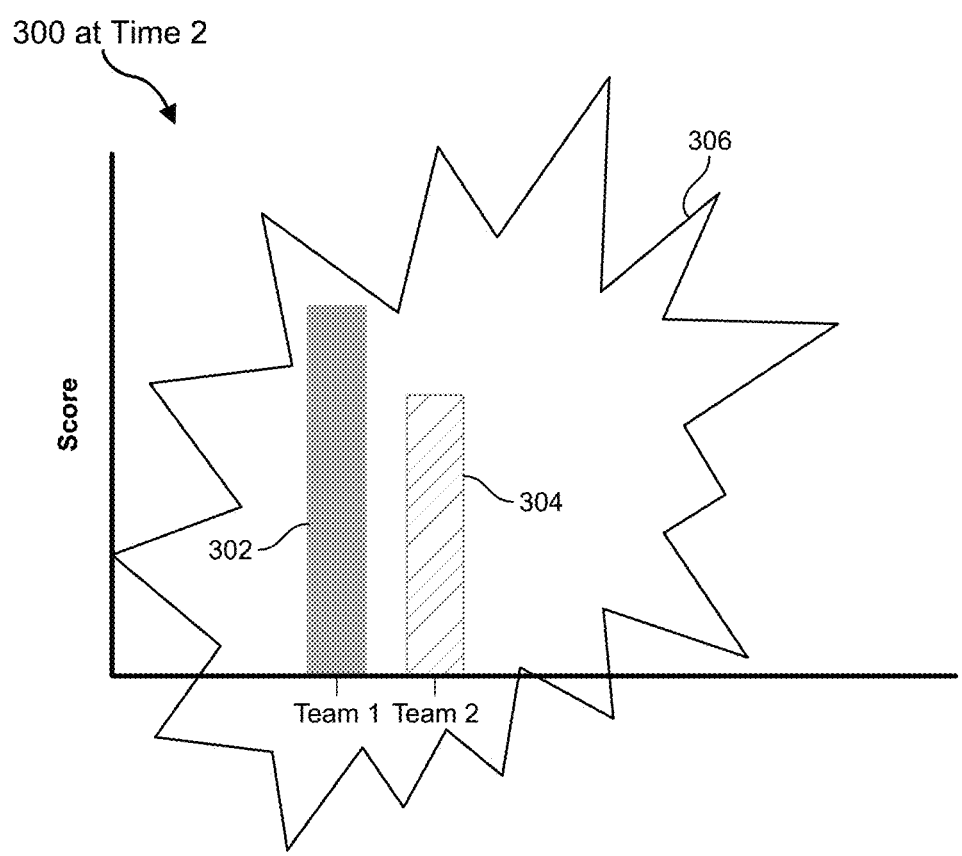
Figure 3C:
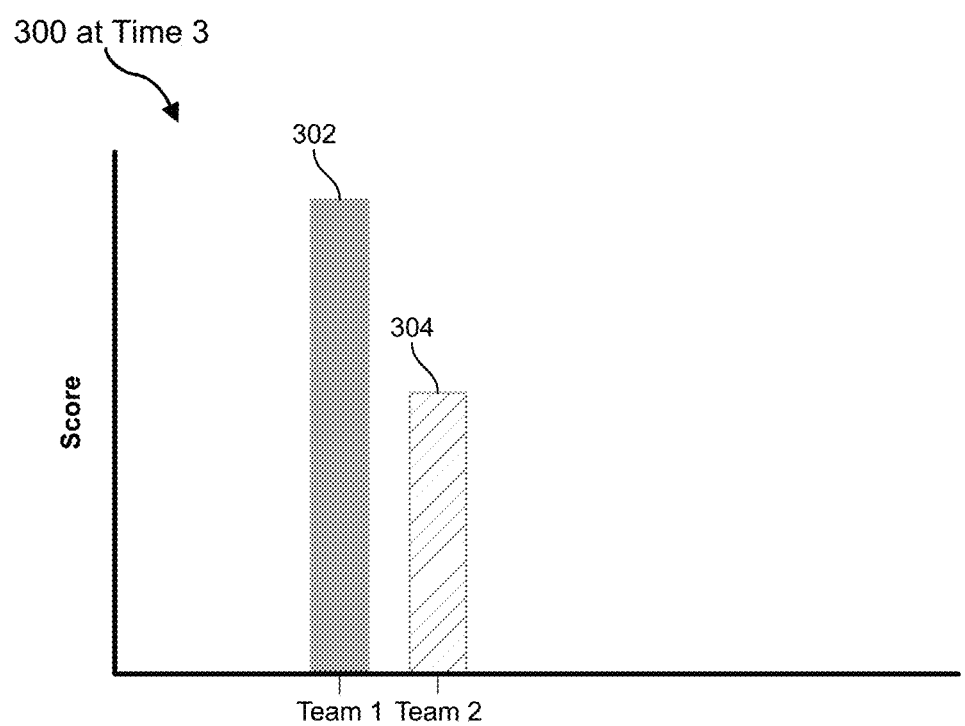

FIGS. 3A-3C provide an exemplary illustration in which dynamic graph 222 represents a dynamic bar graph 300. As shown in FIGS. 3A-3C, dynamic bar graph 300 includes animated bars that show the score-advancement of two teams: "Team 1," whose score is indicated by a first bar 302, and "Team 2," whose score is indicated by a second bar 304. FIG. 3A corresponds to a first moment within dynamic digital representation 220 (Time 1) in which Team 2 has a higher score than Team 1. Team 2's higher score is visually depicted by second bar 304's height surpassing the height of first bar 302. Then, FIG. 3B corresponds to a subsequent moment in time within dynamic digital representation 220 (Time 2) in which Team 1 has a higher score than Team 2. In this figure, Team 1's higher score is visually depicted by first bar 302's height growing to surpass its previous height and the height of second bar 304. Finally, FIG. 3C corresponds to a post-subsequent moment in time within dynamic digital representation 220 (Time 3) in which Team 1's score increases again (visually depicted by first bar 302's height growing to surpass its previous height).

Figure 4A:
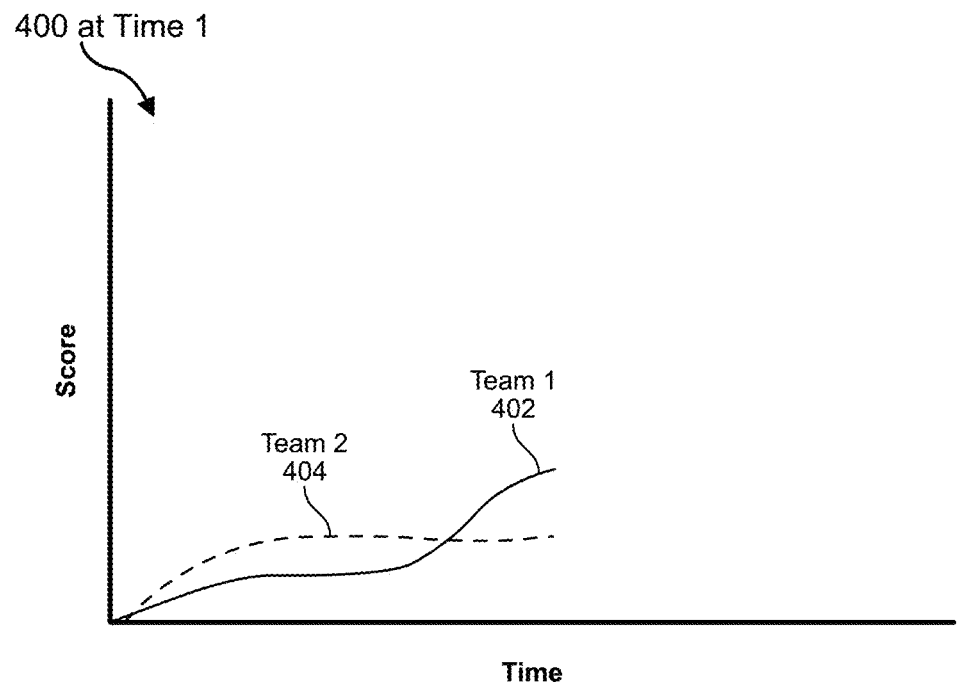
FIGS. 4A-4B are an illustration of an exemplary dynamic line graph digitally depicting dueling event scores in one embodiment.
Figure 4B:
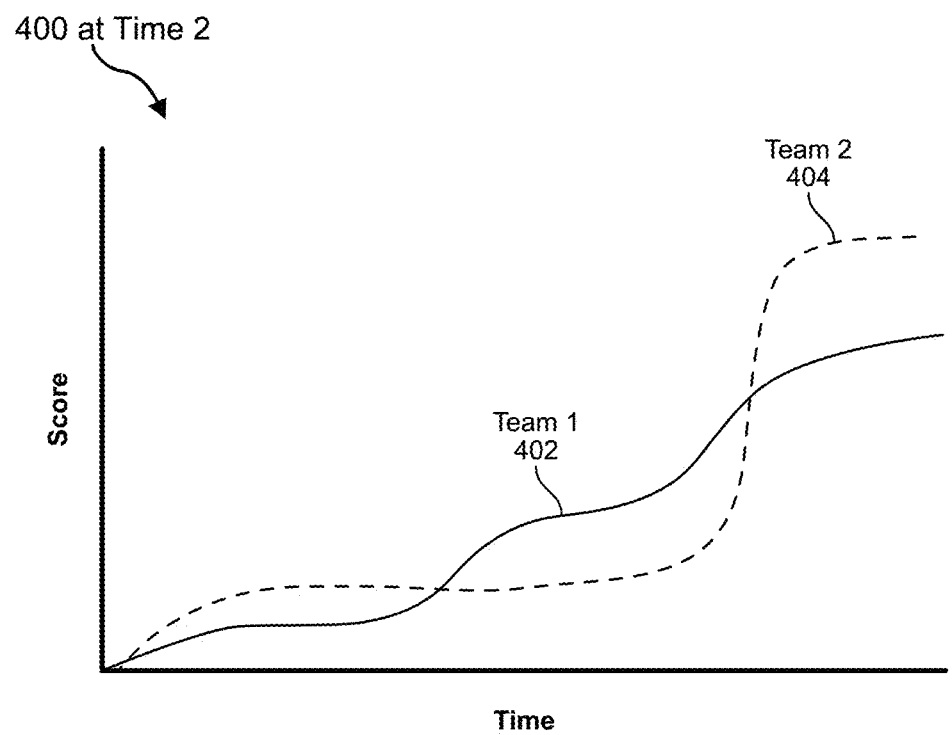

FIGS. 4A-4B provide an exemplary illustration in which dynamic graph 222 represents a dynamic line graph 400. As shown in FIGS. 4A-4B, dynamic line graph 400 includes animated lines that visually depict the score-advancements of two teams: "Team 1," whose score is indicated by a first line 402, and "Team 2," whose score is indicated by a second line 404. At a first moment within dynamic digital representation 220 (Time 1 illustrated in FIG. 4A), Team 1 may have a higher score than Team 2 and, as such, first line 402 may be visually positioned above second line 404 within dynamic line graph 400. Then, at a second moment within dynamic digital representation 220 (Time 2 illustrated in FIG. 4B), Team 2 may have a higher score than Team 1 and, as such, second line 404 may change to be visually positioned above first line 402 within dynamic line graph 400.

Figure 5A:
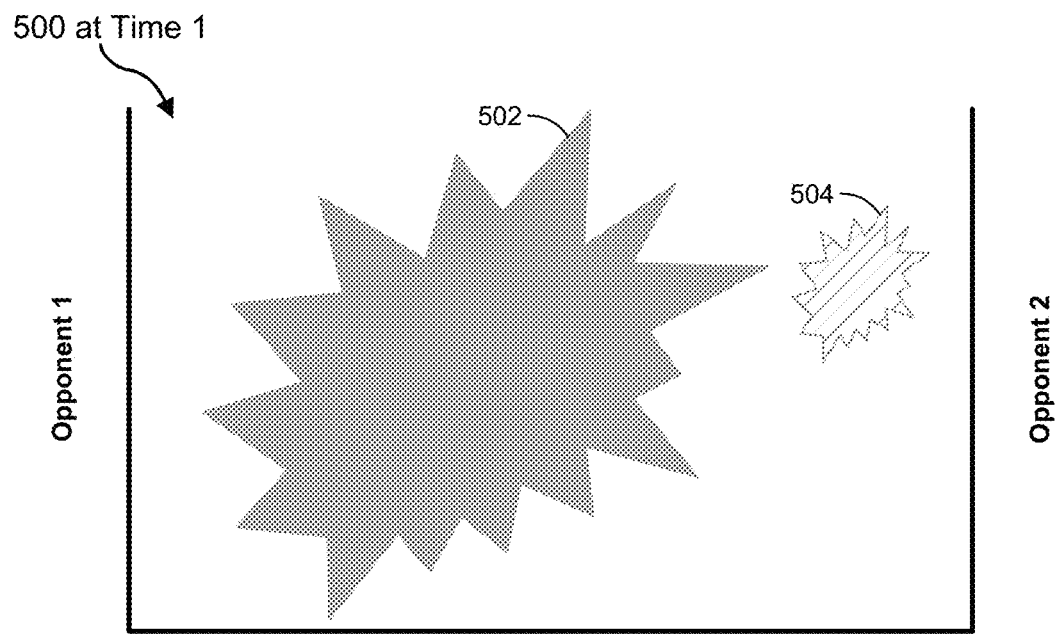
FIGS. 5A-5B are an illustration of an exemplary dynamic star graph depicting a relative advancement of two entities.
Figure 5B:
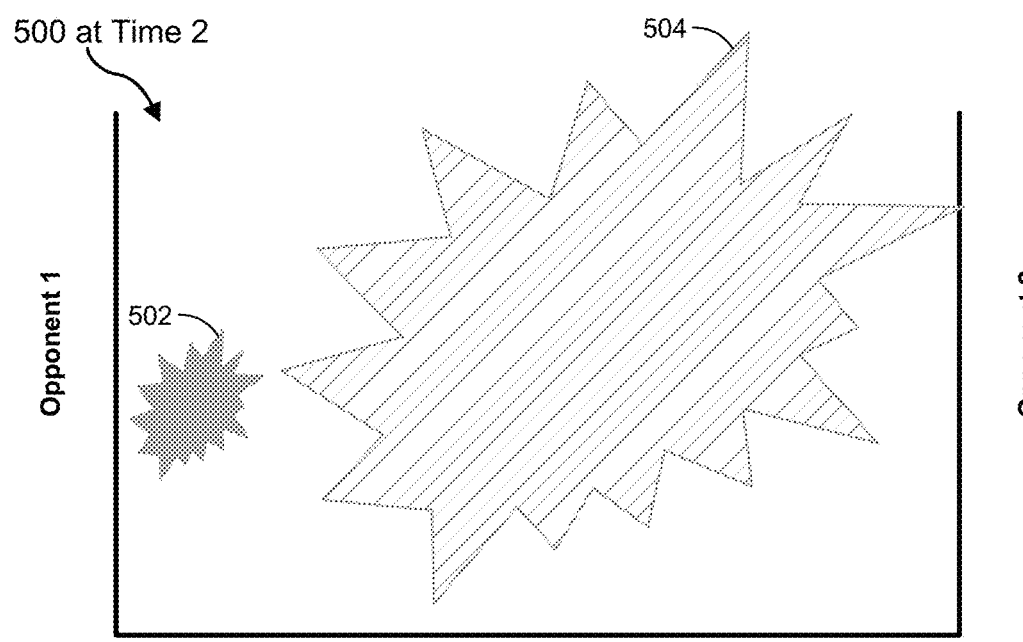

FIGS. 5A-5B provide an exemplary illustration in which dynamic graph 222 includes a dynamic star graph 500 that shows an advancement of two entities (e.g., opponents in a boxing match): "Opponent 1," whose advancement is visually depicted by a size of a first star graphic 502, and "Opponent 2," whose advancement is visually depicted by a size of a second star graphic 504. FIG. 5A corresponds to a first moment within dynamic digital representation 220 (Time 1) at which Opponent 1 has made an advancement (e.g., has thrown one or more punches at Opponent 2). This advancement is depicted by first star graphic 502 swelling in size. FIG. 5B corresponds to a second moment within dynamic digital representation 220 (Time 2) at which Opponent 2 has made an advancement (e.g., has thrown one or more return punches). This advancement is depicted by second star graphic 504 swelling in size.

Figure 6A:
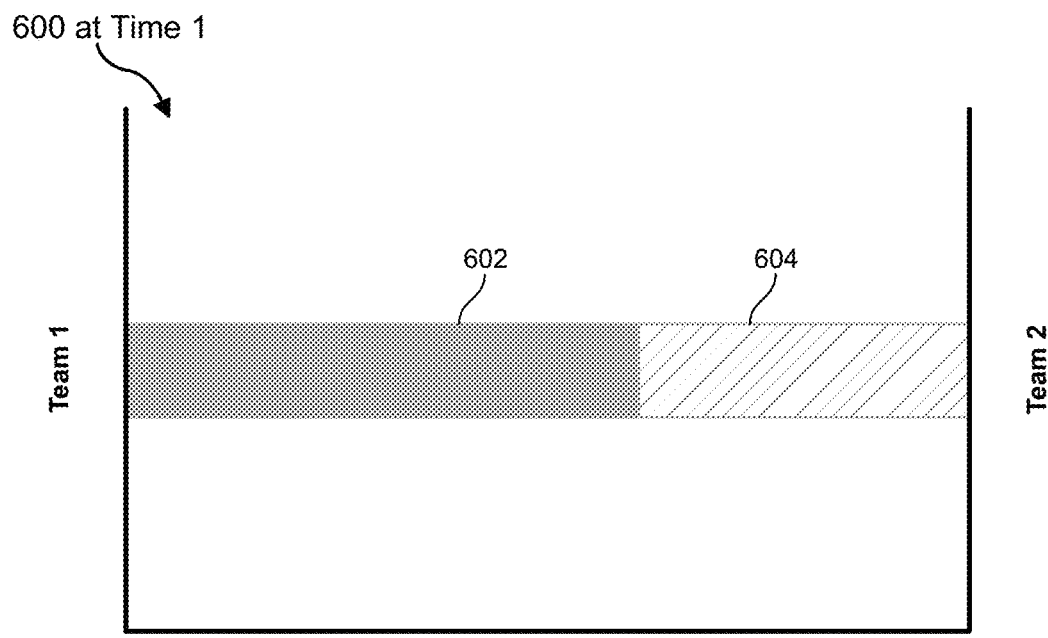
FIGS. 6A-6B are an illustration of an exemplary dynamic segmented-line graph depicting a relative advancement of two entities.
Figure 6B:
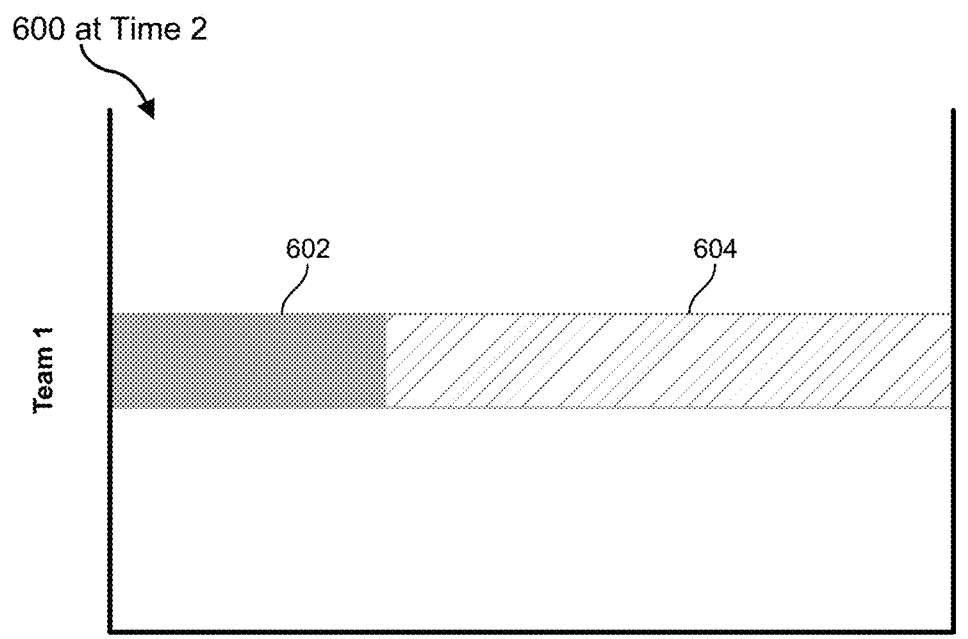

FIGS. 6A-6B provide an exemplary illustration in which dynamic digital representation 220 includes a dynamic segmented-line graph 600 that illustrates the relative advancement of two teams: "Team 1," whose advancement is indicated by a first bar-segment 602, and "Team2," whose advancement is indicated by a second bar-segment 604. FIGS. 6A-6B may correspond to an event in which there is a leading team but no score. A leader and/or change in leader may be signaled by a relative size and/or change in relative size of each bar-segment. For example, FIG. 6A may correspond to a first moment within dynamic digital representation 220 (Time 1) in which Team 1 is in the lead. Team 1's lead is visually depicted in FIG. 6A by first bar-segment 602 receiving a greater portion of dynamic segmented-line graph 600 than is allocated to second bar-segment 604. The lead is reversed in FIG. 6B at Time 2. This reversal is visually depicted by second bar-segment 604 receiving a greater portion of dynamic segmented-line graph 600 than is allocated to first bar-segment 602.

In addition to dynamic graph 222, in some examples, dynamic digital representation 220 may include one or more multimedia effects (e.g., special effect elements) that emphasize the emotions identified within timeline 216. Dynamic digital representation 220 may include a variety of multimedia effects. For example, dynamic digital representation 220 may include a sound bite (e.g., a recording of an explosion and/or of audience noise such as a cheer, a boo, and/or a laugh) and/or music content (e.g., a soundtrack) that increases and/or decreases in intensity (e.g., in volume and/or in tempo).

As another example, dynamic digital representation 220 may include a visual multimedia effect (e.g., a graphic such as an emoji, an image, an animation, etc.). For example, dynamic digital representation 220 may include a graphic of exploding stars, fuming steam, a crashing train, and/or a flag waving. In some examples, the visual element may be superimposed over dynamic graph 222. FIG. 3B provides an illustration of dynamic digital representation 220, according to one embodiment, in which a multimedia effect (i.e., a star effect 306) is superimposed over dynamic bar graph 300. Additionally or alternatively, the visual element may be displayed as part of a background to dynamic graph 222 and/or displayed between frames displaying dynamic graph 22.

In some embodiments, as discussed above in connection with step 120, timeline module 214 may have selected one or more clips of a recording of event 212 (i.e., clips of moments corresponding to an intensity of emotion that surpassed a threshold). In these embodiments, generation module 218 may include one or more of the selected clips within dynamic digital representation 220.

Finally, at step 140, one or more of the systems described herein may transmit the dynamic digital representation to a device for display via a display element of the device. For example, as illustrated in FIG. 2, a display module 224 may transmit dynamic digital representation 220 to user device 204 for display via a display element 226 of user device 204.

Display module 224 may transmit dynamic digital representation 220 via a variety of channels. In some examples, display module 224 may transmit dynamic digital representation 220 via a digital platform associated with event 212 (e.g., within a recap webpage dedicated to displaying dynamic digital representations of events). In one embodiment, display module 224 may transmit dynamic digital representation 220 via a digital notification (e.g., via an email and/or text message transmitted in response to receiving user input soliciting such notifications). In some embodiments, display module 224 may transmit dynamic digital representation 220 as a recommended video and/or as a social media post within a social media platform.

As described throughout the instant disclosure, the present disclosure provides systems and methods for creating automatic digital representations of events. In one example, a computer-implemented method may include (1) collecting data indicative of one or more emotions experienced by viewers of an event, (2) generating a timeline of the emotions based on the collected data, (3) creating a dynamic digital representation of the timeline, and (4) transmitting the dynamic digital representation to a device for display via a display element of the device. In some examples, the event may represent a competition, such as a sporting event, an election, a performance, and/or a virtual event.

In some examples, the data may include a score metric that relates to a score of the competition. The score metric may describe, without limitation, (1) a progression of a score of the competition, (2) a closeness of the score, (3) a magnitude of a change in the score, (4) a time left in the competition, and/or (5) a change in competitor with a highest score.

In some examples, the data may include a measure of an audible loudness of an audience of the event and/or a rate of speech of an announcer of the event. In additional or alternative examples, the data may include data collected from one or more digital comments posted to a platform related to the event. In some embodiments, the data collected from the digital comments may include (1) a number of digital comments posted to the platform, (2) a change in the number of digital comments at various moments during the event, and/or (3) content within the digital comments.

In one embodiment, the dynamic digital representation may include a dynamic graph (e.g., a bar graph with one or more dynamic bars that depict a score of the competition and/or a line graph with one or more dynamic lines that depict the score of the competition). Additionally or alternatively, the dynamic digital representation may include one or more multimedia effects that emphasize the identified emotions.

In some examples, the method may further include (1) identifying, based on the timeline, one or more moments with an intensity of emotion that surpasses a threshold and (2) selecting one or more clips of one or more of the moments. In these examples, creating the dynamic digital representation may include including the selected clips within the dynamic digital representation.

In one example, a corresponding system for implementing the above-described method may include (1) a collection module, stored in memory, that collects data indicative of one or more emotions experienced by viewers of an event, (2) a timeline module, stored in memory, that generates a timeline of the emotions based on the data, (3) a generation module, stored in memory, that creates a dynamic digital representation of the timeline, (4) a display module, stored in memory, that transmits the dynamic digital representation to a device for display via a display element of the device, and (5) at least one physical processor configured to execute the collection module, the timeline module, the generation module, and the display module.

In some examples, the above-described method may be encoded as computer-readable instructions on a non-transitory computer-readable medium. The computer-readable medium may include one or more computer-executable instructions that, when executed by a processor of a computing device, may cause the computing device to (1) collect data indicative of one or more emotions experienced by viewers of an event, (2) generate a timeline of the emotions based on the collected data, (3) create a dynamic digital representation of the timeline, and (4) transmit the dynamic digital representation to a device for display via a display element of the device.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an", as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    collecting (1) data indicative of a competition's score progression as the competition progresses temporally and (2) data indicative of one or more emotions experienced by viewers of the competition in response to the score progression as the competition progresses temporally;
    generating, based on the collected data, a timeline that portrays (1) the score progression at a plurality of timestamps and (2) an emotion associated with the score progression at each of the timestamps;
    creating a dynamic digital representation of the timeline that depicts both the score progression and the emotions associated with the score progression; and
    transmitting the dynamic digital representation to a device for display via a display element of the device.

2. The computer-implemented method of claim 1, further comprising identifying the emotion associated with each timestamp by:
    clustering data points, from the data indicative of the one or more emotions, around the timestamp;
    applying the clustered data points as inputs to a neural network; and
    identifying the emotion as an output of the neural network.

3. The computer-implemented method of claim 1, wherein the competition comprises a sporting event.

4. The computer-implemented method of claim 1, wherein the competition comprises at least one of:
    an election;
    a performance; or
    a virtual event.

5. The computer-implemented method of claim 1, wherein:
    collecting the data indicative of the score progression further comprises collecting data describing at least one of:
        a closeness of the score;
        a magnitude of a change in the score;
        a time left in the competition; or
        a change in competitor with a highest score.

6. The computer-implemented method of claim 1, wherein the data indicative of the one or more emotions comprises a measure of an audible loudness of an audience of the competition.

7. The computer-implemented method of claim 1, wherein the data indicative of the one or more emotions comprises a rate of speech of an announcer of the competition.

8. The computer-implemented method of claim 1, wherein the data indicative of the one or more emotions comprises data collected from one or more digital comments posted to a platform related to the competition.

9. The computer-implemented method of claim 8, wherein the data collected from the digital comments comprises at least one of:
    a number of digital comments posted to the platform;
    a change in the number of digital comments at various moments during the competition; or
    content within the digital comments.

10. The computer-implemented method of claim 1, wherein the dynamic digital representation comprises a dynamic graph.

11. The computer-implemented method of claim 10, wherein the dynamic graph comprises at least one of:
    a bar graph with one or more dynamic bars that depict a score of the competition; or
    a line graph with one or more dynamic lines that depict the score of the competition.

12. The computer-implemented method of claim 1, wherein the dynamic digital representation comprises one or more multimedia effects that emphasize the identified emotions.

13. The computer-implemented method of claim 1, wherein:
    the method further comprises:
        identifying, based on the timeline, one or more moments with an intensity of emotion that surpasses a threshold; and
        selecting one or more clips of at least one of the moments; and
    creating the dynamic digital representation comprises including the selected clips within the dynamic digital representation.

14. A system comprising:
    a collection module, stored in memory, that collects (1) data indicative of a competition's score progression as the competition progresses temporally and (2) data indicative of one or more emotions experienced by viewers of the competition in response to the score progression as the competition progresses temporally;
    a timeline module, stored in memory, that generates, based on the collected data, a timeline that portrays (1) the score progression at a plurality of timestamps and (2) an emotion associated with the score progression at each of the timestamps;
    a generation module, stored in memory, that creates a dynamic digital representation of the timeline that depicts both the score progression and the emotions associated with the score progression;
    a display module, stored in memory, that transmits the dynamic digital representation to a device for display via a display element of the device; and
    at least one physical processor configured to execute the collection module, the timeline module, the generation module, and the display module.

15. The system of claim 14, wherein the competition comprises a sporting event.

16. The system of claim 14, wherein the competition comprises at least one of:
    an election;
    a performance; or
    a virtual event.

17. The system of claim 14, wherein the dynamic digital representation comprises a dynamic bar graph.

18. The system of claim 14, wherein the dynamic digital representation comprises one or more multimedia effects that emphasize the identified emotions.

19. The system of claim 14, wherein:
    the timeline module further:
        identifies, based on the timeline, one or more moments with an intensity of emotion that surpasses a threshold; and
        selects one or more clips of at least one of the moments; and
    the generation module further includes the clips within the dynamic digital representation.

20. A non-transitory computer-readable medium comprising one or more computer-readable instructions that, when executed by at least one processor of a computing device, cause the computing device to:

collect (1) data indicative of a competition's score progression as the competition progresses temporally and (2) data indicative of one or more emotions experienced by viewers of the competition in response to the score progression as the competition progresses temporally;

generate, based on the collected data, a timeline that portrays (1) the score progression at a plurality of timestamps and (2) an emotion associated with the score progression at each of the timestamps;

creating a dynamic digital representation of the timeline that depicts both the score progression and the emotions associated with the score progression; and transmit the dynamic digital representation to a device for display via a display element of the device.

\* \* \* \* \*